UNITED STATES PATENT OFFICE.

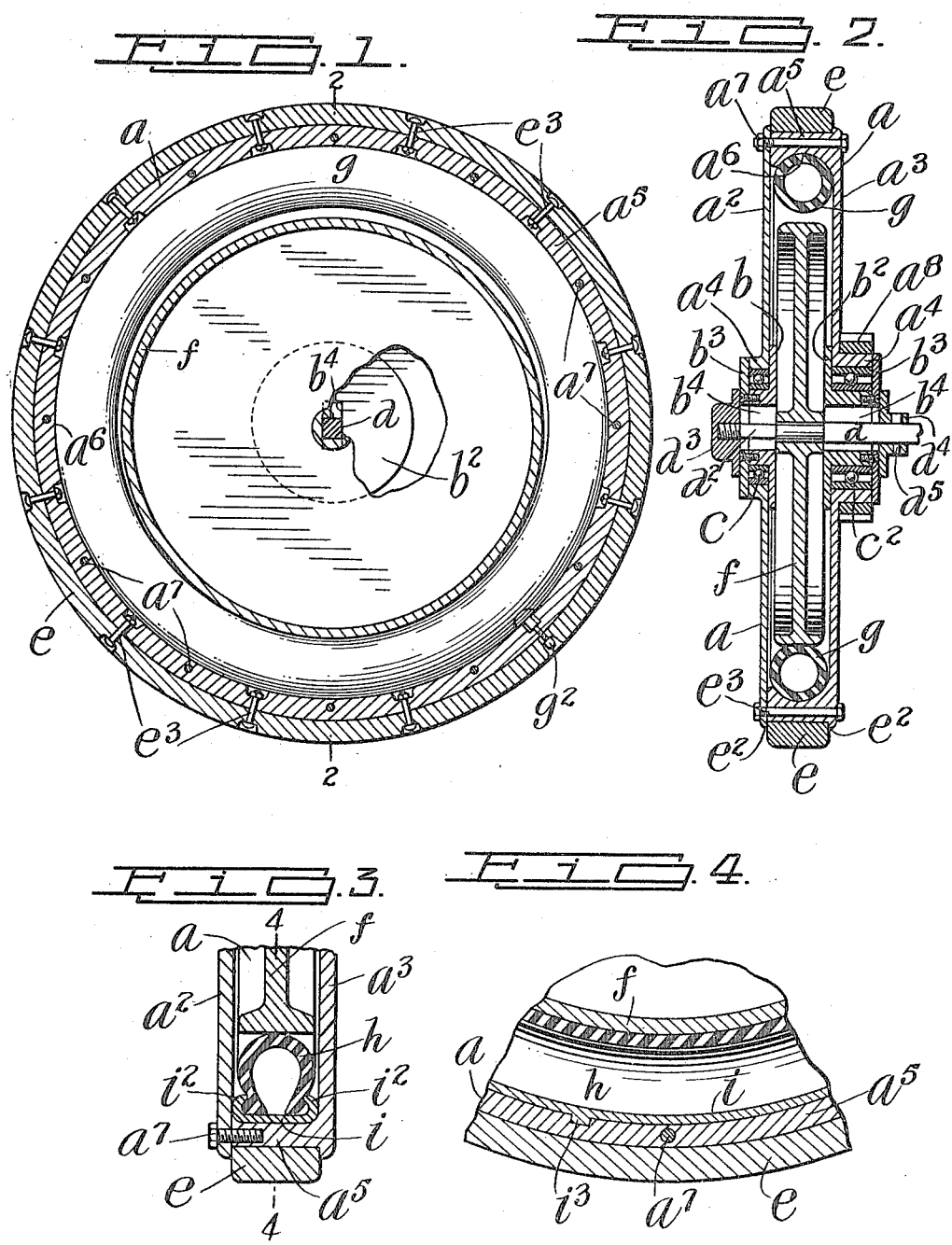

EMIL O. LINDNER, OF BROOKLYN, NEW YORK, ASSIGNOR OF ONE-HALF TO JOHN JENCHEN, OF NEW YORK, N. Y.

VEHICLE WHEEL CONSTRUCTION.

1,137,154.  Specification of Letters Patent.  Patented Apr. 27, 1915.

Application filed July 16, 1914. Serial No. 851,237.

*To all whom it may concern:*

Be it known that I, EMIL O. LINDNER, a citizen of the United States, and residing at Brooklyn, in the county of Kings and State of New York, have invented certain new and useful Improvements in Vehicle Wheel Constructions, of which the following is a specification, such as will enable those skilled in the art to which it appertains to make and use the same.

This invention relates to wheel constructions for vehicles of any class, and the object thereof is to provide a wheel of this class so constructed that the same will act as a shock absorber as well as an ordinary wheel, and also possess the qualities of a spring or elastic wheel, and pneumatic tire.

The invention is fully disclosed in the following specification, of which the accompanying drawing forms a part, in which the separate parts of my improvement are designated by suitable reference characters in each of the views, and in which:—

Figure 1 is a sectional side view of one form of wheel showing my improvement applied thereto; Fig. 2 a section on the line 2—2 of Fig. 1; Fig. 3 a view similar to Fig. 2 showing only a part of the construction and showing a modification; and Fig. 4 a section on the line 4—4 of Fig. 3.

In Figs. 1 and 2 of the drawing, I have shown at $a$ a main outer wheel member composed of separate outer and inner side plates $a^2$ and $a^3$, each of which are provided with a circular hub flange $a^4$, and the inner side plate $a^3$ is provided with a rim member $a^5$, the inner surface of which is provided with a groove $a^6$, and the plates $a^2$ and $a^3$ of the main outer wheel member $a$ are secured together by bolts $a^7$ which are passed through the rim member $a^5$.

Mounted within the hub flanges $a^4$ are annular bearing holders $b$ and $b^2$ which are L-shaped in cross section and each of which is provided with a detachable outer plate $b^3$, and mounted between the bearing holders $b$ and $b^2$ and the hub flanges $a^4$ are bearings $c$ and $c^2$ which may be of any desired form.

The bearing holders $b$ and $b^2$ are provided with elongated slots $b^4$ through which passes a fixed angular axle shaft $d$ and the outer end of said axle shaft is provided with a spindle $d^2$ and nut $d^3$ and a flanged collar $d^4$ is secured to the axle shaft as shown at $d^5$ and inwardly of the wheel and by means of this construction the wheel casing $a$ is held in proper position on the axle shaft $d$, and said shaft is permitted to move vertically in the bearing holders $b$ and $b^2$.

The rim member $a^5$ is provided with a flexible tire $e$ and in the construction shown said tire is held in place by flanges $e^2$ on the wheel member $a$ and by bolts $e^3$, but the tire may be secured to the rim member $a^5$ in any desired manner, and the hub flange $a^4$ of the plate $a^3$ is provided with a gear $a^8$ by means of which said wheel member $a$ may be rotated, in the usual or any desired manner.

The parts $a$ to $e^3$ inclusive are of the usual general construction with the exception of the specific design shown, and in the practice of my invention, I place on the axle shaft spindle $d^2$ between the bearing holders $b$ and $b^2$, a rotatable inner wheel $f$ which may be of any desired construction, and placed in the groove $a^6$ of the rim member $a^5$ is a flexible rubber tube $g$ provided with an air valve $g^2$.

In the drawing, the wheel $f$ is shown bearing on the tube $g$ at the bottom thereof and to an extent sufficient to support the load of the vehicle, and in the operation of said vehicle should the wheel strike an obstruction the wheel $f$ would depress the tube $g$ to a greater or less extent thereby acting as a shock absorber.

In Figs. 3 and 4, I have shown a modification in which the inner surface of the rim member $a^5$ is made straight in cross section and in place of the rubber tube $g$, I employ an elastic tube $h$ and a metal band $i$ provided with side flanges $i^2$ by means of which the tube $h$ is held in connection with said band, and the metal band $i$ may or may not be secured to the rim member $a^5$, and the band $i$ is also provided with projections $i^3$ which engage corresponding recesses in the rim member $a^5$ to insure the rotation of said band $i$ and the tube $h$. That parts of the spindle of the axle shaft $d$ on which the bearing holders $b$ and $b^2$ are mounted are angular in form and both of the bearing holders $b$ and $b^2$ are thus fixed against rotation, and with this construction, I provide a wheel having all the qualities of an elastic or spring wheel, or of a pneumatic tired wheel and which at the same time will be strong and durable and possess all the qualities of wheels of the class specified.

From the foregoing description it will be seen that the parts $b$—$b^2$ and $b^3$ form side hub members which are radially movable on the axle, or the spindle thereof, and the main outer wheel member $a$ is mounted on these side hub members and rotatable thereon.

In the accompanying drawing the cushion member is shown connected with the outer wheel member, and this feature is so described, but it will be understood that my invention is not limited to this arrangement and if desired the cushion member may be connected with the inner wheel member without materially altering the construction, operation and result, and other changes in and modifications of the construction herein described may be made, within the scope of the appended claims, without departing from the spirit of my invention or sacrificing its advantages.

Having fully described my invention, what I claim as new and desire to secure by Letters Patent, is:—

1. A wheel construction, comprising a fixed axle having a spindle, opposite side hub members radially movable on said spindle, a main wheel member mounted on said hub members and rotatable thereon, and a supplemental inner wheel member mounted on said spindle and inclosed by said hub members and the main wheel member.

2. A wheel construction, comprising a fixed axle having a spindle, opposite side hub members radially movable on said spindle, a main wheel member mounted on said hub members and rotatable thereon, and a supplemental inner wheel member mounted on said spindle and inclosed by said hub members and the main wheel member, said main wheel member being provided within the outer portion thereof with a flexible tube on which the inner supplemental wheel member is adapted to bear.

3. A wheel construction, comprising a fixed axle having a spindle, opposite side hub members radially movable on said spindle, a main wheel member mounted on said hub members and rotatable thereon, and a supplemental inner wheel member mounted on said spindle, said main wheel member being provided within the outer portion thereof with a flexible member on which the inner supplemental wheel member is adapted to bear.

4. A wheel construction, comprising a fixed axle having a spindle, opposite side hub members radially movable on said spindle, a main wheel member mounted on said hub members and rotatable thereon, a supplemental inner wheel member mounted on said spindle, said main wheel member being provided within the outer portion thereof with a flexible member on which the inner supplemental wheel member is adapted to bear, and means for holding said flexible member in place.

5. A wheel construction, comprising a fixed axle having a spindle, opposite side hub members radially movable on said spindle, a main wheel member mounted on said hub members and rotatable thereon, and a supplemental inner wheel member mounted on said spindle, said main wheel member being provided on its outer face portion with a flexible member.

In testimony that I claim the foregoing as my invention I have signed my name in presence of the subscribing witnesses this 15th day of July 1914.

EMIL O. LINDNER.

Witnesses:
C. MULREANY,
H. C. THOMPSON.

Copies of this patent may be obtained for five cents each, by addressing the "Commissioner of Patents, Washington, D. C."